T. R. R. ASHTON.
MAGAZINE FIREARM.
APPLICATION FILED OCT. 30, 1908.
931,983.
Patented Aug. 24, 1909.
2 SHEETS—SHEET 1.
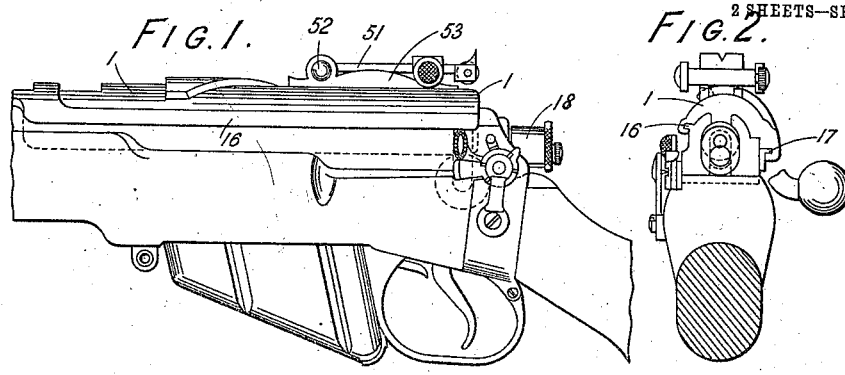
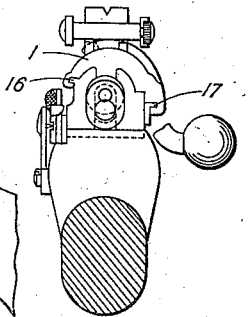
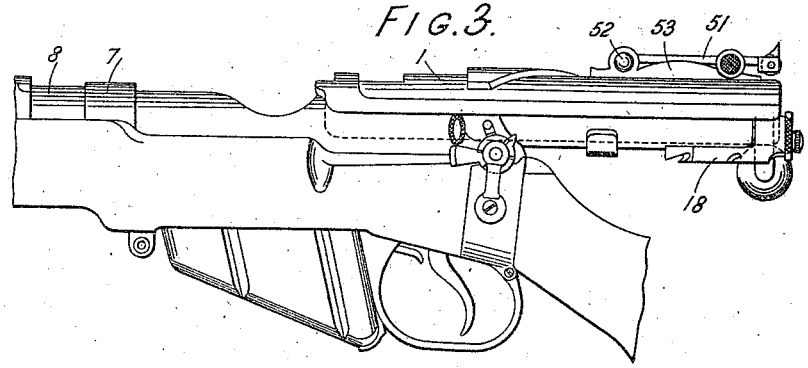
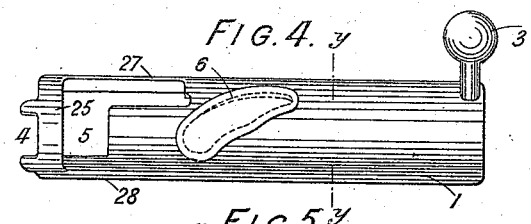
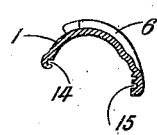
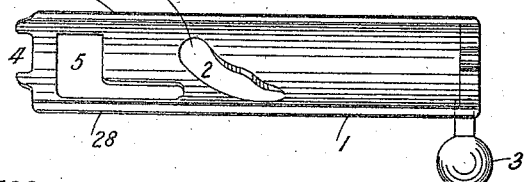
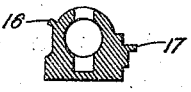
WITNESSES:
INVENTOR:
Thomas R. R. Ashton
By James L. Norris
Atty

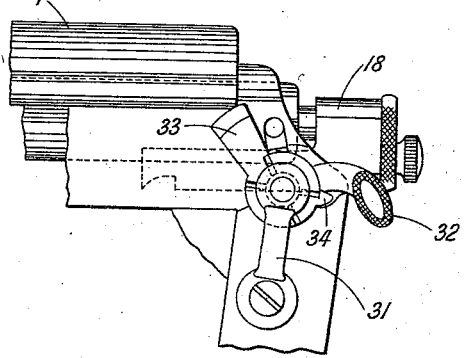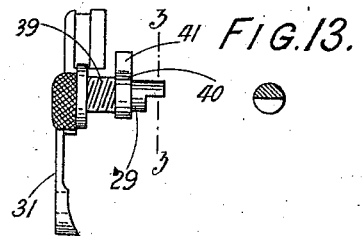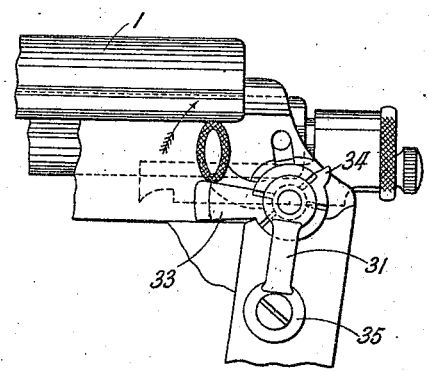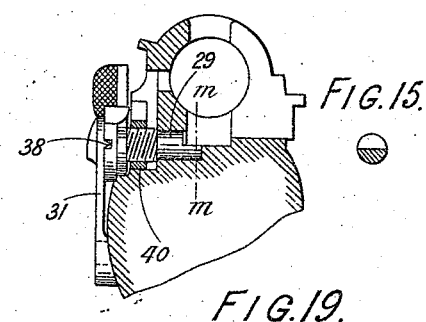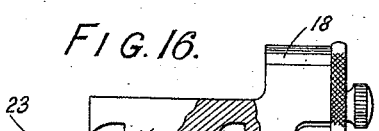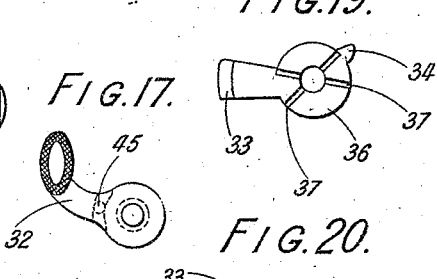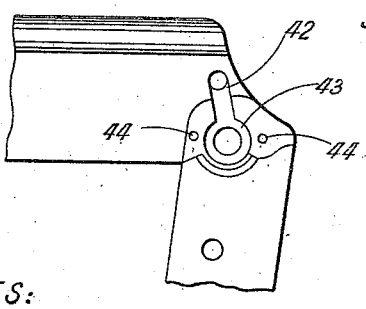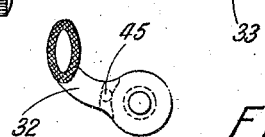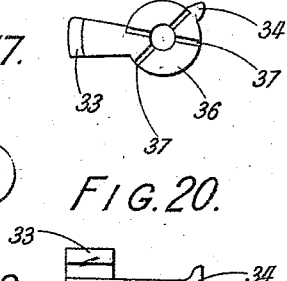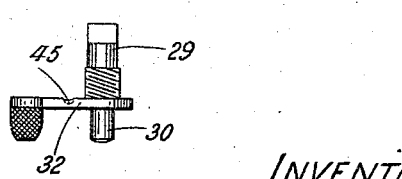

UNITED STATES PATENT OFFICE.

THOMAS ROBERT RANEY ASHTON, OF LONDON, ENGLAND.

MAGAZINE-FIREARM.

931,983. Specification of Letters Patent. Patented Aug. 24, 1909.

Application filed October 30, 1908. Serial No. 460,354.

*To all whom it may concern:*

Be it known that I, THOMAS ROBERT RANEY ASHTON, engineer, a subject of the King of the British dominions, residing at London, England, and whose post-office address is 40 Blandford Square, London, England, have invented certain new and useful Improvements in Magazine-Firearms, of which the following is a specification.

This invention relates to the breech-action of rifles provided with a straight-pull bolt operating slide and dust cover, and has for its objects: 1. To provide the said slide with a forward extension, which acts on the bolt-head at the commencement of the retractive motion of the bolt and thereby increases the durability of the bolt. 2. To provide the said slide with a forward extension which serves as a guide to the cartridge magazine or charger. 3. To utilize the dust cover as a support for the back-sight of the rifle.

The invention also comprises an improved shape of the groove, which produces the rotary motion to the bolt, and an improved safety locking device for the slide and the firing pin.

In the accompanying drawings Figure 1 is a side view and Fig. 2 a rear view of the breech part of an English short service rifle modified according to my invention, the straight-pull slide containing the bolt being shown in the extreme forward position. Fig. 3 is a side view corresponding to Fig. 1, but showing the straight-pull slide in the extreme rear position. Fig. 4 is a plan of the straight-pull slide, Fig. 5 is a side view of the bolt and cocking head, Fig. 6 is a section of the bolt along line X—X of Fig. 5, Fig. 7 is an inverted plan of the straight-pull slide, Fig. 8 is a section of the straight-pull slide along line y—y of Fig 4, Fig. 9 is a section of the breech frame, Figs. 10 to 21 are enlarged detail views of a safety locking device for the straight-pull slide and cocking head, Fig. 10 is a side view showing the rear end of the operating slide in its extreme forward or firing position, the cocking head 18, which is connected with the rear end of the firing pin, in the cocked position, and the safety locking device, the latter being shown in section and serving to prevent the retraction of the slide or the forward motion of the firing pin. Fig. 11 is a side view showing the cocking head, after the firing pin has been shot forward, and the safety device in the open or unlocked position. Fig. 12 is a rear view of the locking pin in the same position as in Fig. 10. Fig. 13 is a section along line z—z of Fig. 12, and Fig. 14 is a side view of the locking pin in the same position as in Fig. 11. Fig. 15 is a section along line m—m of Fig. 14. Fig. 16 is a sectional side view of the cocking head.

1 is the straight-pull bolt operating slide constructed so as to serve as a dust-cover protecting the interior of the breech mechanism from dust and sand.

The operating slide is guided parallel to the bolt-axis by a pair of longitudinal grooves 14 and 15, in which are adapted to slide guide rails 16 and 17 formed on the side of the breech frame, as indicated by Figs. 2, 8 and 9.

The slide and dust cover 1 has in its underside a helically curved groove 2 adapted to receive the friction roller 20 mounted on a stud 19 projecting from the side of the bolt, as shown in Fig. 6, and serving to produce a rotary locking and unlocking motion of the bolt. During the first part of the retractive motion of the slide 1 viz: that which produces the rotary motion of the bolt, the said friction roller slides in the groove 2. As shown by Fig. 4, the rear end of this groove is almost parallel to the axis of the bolt, while the front part forms a steeper angle and terminates in a rest or pocket *a*, and the portion 6 of the dust-cover 1 in proximity to the groove is strengthened. The said rest *a* offers a resistance to any accidental turning motion of the bolt, after it has reached its extreme position.

The handle 3 of the dust-cover is placed near its rear end in convenient proximity to the trigger.

In the drawings 7 is the front end of the breech frame, 8 is the gun barrel, 9 the projecting part of the ordinary bolt head 10, 11 is an ordinary bolt, with its guide lug 12 and locking lug 13, but provided with a stud 19 and friction roller 20, as mentioned above.

The slide or dust-cover 1 extends forward from the slot 2 and has at the front end a slot or opening 4, which is slightly wider than the cartridge charger or movable cartridge magazine and is placed so, that in the extreme rear position of the slide, shown by Fig. 3, the said groove 4 serves to guide the rear end of the cartridge charger, when it is being introduced from above into the magazine opening of the rifle.

Between the front end of the slide 1 and the groove 2, there is an opening 5 placed so that, when the slide 1 has been withdrawn sufficiently to turn and unlock the bolt, and the roller 20 is therefore at the front end of the slot 2, the face 25 of the slide impinges against the face 26 of the bolt head 10. Consequently during the further retractive motion of the slide the pressure of the face 25 upon the bolt head serves to draw the empty cartridge case out of the cartridge bed, thus relieving the strain on the stud 19 and the neck of the bolt, and avoiding the danger of breaking the stud 19 or the neck of the bolt, which is made of hard steel.

In my improved mechanism the retractive motion of the slide, after the stud 19 has reached the front end $a$ of the slot 2, acts on the bolt through the sides 27 and 28 and the face 25 of the front part forming a bridge across the top of the gun barrel.

The safety locking device illustrated by Figs. 10 to 21 is constructed as follows:—
The base 23 of the ordinary cocking head has a recess 24 adapted to receive the upper half of a cylindrical pin 29 mounted in the side of the breech frame at right angles to the said base across the lower edge of the same. The pin 29 is cut out diametrically at the inner extremity for a width corresponding to the width of the base 23, as shown by Figs. 12, 13, 14 and 15. The outer end 30 of the pin 29 is pivoted in the upper end of a flat spring 31 fixed at its lower end by a screw 35. On the pin 29 is fixed a primary locking lever 32 adapted to act on the arms 33 and 34 of a locking disk 36 shown separately by Figs. 19 and 20. The said locking disk is mounted on the outer end 30 of the pin 29 between the lever 32 and the head of the spring 31, and adapted to turn on the locking pin. In the locking position shown by Fig. 10 the arm 33 abuts against the dust-cover 1, so as to prevent the same from moving backward and the notched inner extremity of the pin 29 occupies the position shown by Fig. 13, so as to project into the recess 24 of the cocking head 18, and to prevent the bolt from moving forward or backward. The cocking head, together with the firing pin, is therefore locked, as well as the straight-pull slide.

For unlocking the breech mechanism, the lever 32 is turned forward in the direction opposite to the motion of a clockhand, until it enters the notched part of the arm 33, and causes the locking disk 36 to turn with the lever, until it occupies the position shown by Fig. 11. By this motion the arm 33 is turned out of the path of the slide 1, so that the latter can be drawn back, and the locking pin is turned out of the recess 24 of the cocking head.

The locking pin is supported in the breech frame by means of a ring 40 which has an internal screw-thread fitting on the screw-threaded portion 39 of the locking pin, and a lug 41 which is guided in a groove 42 of the breech-frame, the said groove 42 communicating with the socket 43 which receives and forms a bearing for the said ring 40.

The face of the locking disk 36 adjoining the spring 31 has two pairs of radial grooves 37, and the head of the spring 31 has a pair of radial ridges 38 adapted to enter the said radial grooves, so as to prevent the accidental turning of the disk 36.

The locking lever 32 is held fast in either of its extreme positions, as soon as one of the two nipples 44 drops into a recess 45 formed in the said lever (Figs. 17 and 21).

The locking pin 29 with notched inner extremity, lever 32, screw ring 40 and a spring pressing on the end of the pin are similar to those used in present rifles and are not claimed as part of my invention.

The adjustable backsight of rifles is usually mounted on the rear part of the barrel, while the frontsight is fixed to the front end of the same.

As the accuracy of aiming depends to some extent on the distance between the two sights, it is desirable to place the backsight in close proximity to the rear end of the rifle.

With ordinary breech actions this is not practicable, but if a straight-pull bolt-operating slide is used, which has a dust-cover with a wide and accurately guided base, as in the present case, where the said cover is guided by the two ribs 16 and 17, the backsight may be mounted on the dust-cover. This arrangement is illustrated by Figs. 1, 2 and 3, where 51 indicates the adjustable sighting lever hinged at 52 to a frame 53 rigidly fixed to the dust-cover 1. The drawings show the sighting lever in the lowest or turned-down position.

What I claim is:—

1. In magazine rifles, a straight-pull bolt-operating slide extending in a forward direction beyond the rear edge of the magazine opening, and having a recess adapted to guide the rear-end of a cartridge charger, when it is being introduced into the magazine opening of the rifle, substantially as described.

2. In magazine rifles having a bolt with rotary locking action, a straight-pull bolt-operating slide, forming at its front end a bridge across the upper part of the barrel, the said bridge being adapted to strike with its rear edge the bolt-head immediately after the bolt has been unlocked, substantially as described and for the purpose specified.

3. In a device for locking the cocking head and the straight-pull bolt-operating slide of a rifle, the combination of a locking pin extending across the base of the cocking head, a primary locking lever fixed on said pin, a locking disk mounted to turn on the locking pin in proximity to said primary locking lever and arranged to be turned thereby, a spring adapted to press on the outer face of the locking disk, and means between the adjacent faces of the locking disk and spring for retaining the former in either of two positions when moved thereto by said primary locking lever, said locking disk having an arm projecting radially therefrom to retain said bolt-operating slide in forward position.

4. In a device for locking the cocking head and the straight-pull bolt-operating slide of a rifle, the combination of a locking pin extending across the base of the cocking head, a primary locking lever fixed on said pin, a locking disk mounted to turn on the locking pin in proximity to said primary locking lever and arranged to be turned thereby, a spring adapted to press on the outer face of the locking disk, ribs and grooves on the adjacent faces of said spring and locking disk adapted to engage each other when said locking disk has been rocked by said primary locking lever to either extreme position, said locking disk having an arm extending radially therefrom to retain the bolt-operating slide in its forward position.

5. In a device for locking the cocking head and the straight-pull bolt-operating slide of a rifle, the combination of a locking pin extending across the base of the cocking head, a primary locking lever fixed on said pin, a locking disk mounted to turn on the locking pin in proximity to said primary locking lever, a spring adapted to press on the outer face of the locking disk, said locking disk having a pair of radial arms projecting into the path of the primary locking lever and adapted to be rocked thereby in its turning motion both forward and backward, the longer arm being extended to abut against the rear end of the bolt-operating slide so as to retain the latter in its full forward position, and means for retaining the locking disk in its extreme forward or rear position by the pressure of said spring, substantially as described.

6. In a rifle having a combined straight-pull bolt-operating slide and dust-cover, the combination of an approximately semi-cylindrical dust-cover guided by the breech frame, with an adjustable sighting device mounted on the said dust-cover, substantially as and for the purpose described.

In testimony whereof I have hereunto set my hand in presence of two subscribing witnesses.

THOMAS ROBERT RANEY ASHTON.

Witnesses:
J. WETTER,
H. J. BROCKWELL.